United States Patent [19]

Turner et al.

[11] 4,379,973

[45] Apr. 12, 1983

[54] UNIVERSAL LOGIC SWITCH

[75] Inventors: W. Bard Turner, Lexington; Thompson Shek, Brighton, both of Mass.

[73] Assignee: C & K Components, Inc., Newton, Mass.

[21] Appl. No.: 265,463

[22] Filed: May 20, 1981

[51] Int. Cl.[3] .......................... H02B 1/24; H01H 9/00

[52] U.S. Cl. .......................... 307/112; 200/292

[58] Field of Search .......................... 200/292; 361/2; 307/247 A, 112, 134

[56] References Cited

U.S. PATENT DOCUMENTS

| | | | |
|---|---|---|---|
| 3,067,340 | 12/1962 | Hodges | 307/112 X |
| 3,188,435 | 6/1965 | Rugsten | 200/292 X |
| 3,344,243 | 9/1967 | De Vries | 200/16 |
| 3,402,363 | 9/1968 | Johnson | 307/112 X |
| 3,567,894 | 3/1971 | Spreitzer | 200/292 X |
| 3,598,948 | 8/1971 | Bowen et al. | 200/159 R |
| 3,663,780 | 5/1972 | Golbeck | 200/167 |
| 3,714,611 | 1/1973 | Madland | 335/229 |
| 3,740,501 | 6/1973 | Kiessling et al. | 200/16 R |
| 3,797,630 | 3/1974 | Zilkha | 197/98 |
| 3,798,462 | 3/1974 | Rizzo | 307/116 |
| 3,825,772 | 7/1974 | Ainsworth | 307/247 A |
| 3,860,833 | 1/1975 | Tyau | 307/247 A |
| 3,904,887 | 9/1975 | Hagelbarger | 307/139 |
| 3,911,429 | 10/1975 | Watson | 340/365 L |
| 3,934,104 | 1/1976 | Stout | 200/159 R |
| 3,946,254 | 3/1976 | Millben | 307/247 A X |
| 3,962,699 | 6/1976 | Brunson | 340/323 B |
| 3,982,081 | 9/1976 | Demler | 200/159 R X |
| 3,986,039 | 10/1976 | Bovitz | 307/247 A X |
| 3,989,960 | 11/1976 | Kodama | 307/247 A |
| 4,005,316 | 1/1977 | Tomlinson | 307/247 A |
| 4,017,700 | 4/1977 | West | 200/159 A X |
| 4,028,560 | 6/1977 | Bainter | 307/247 A |
| 4,056,701 | 11/1977 | Weber | 200/314 |
| 4,079,269 | 3/1978 | Numata et al. | 307/247 A |
| 4,096,368 | 6/1978 | Grebner | 200/314 |
| 4,134,026 | 1/1979 | Sone et al. | 307/247 A X |
| 4,159,497 | 1/1979 | Heyward et al. | 361/2 |
| 4,185,205 | 1/1980 | Jagoda et al. | 307/38 |
| 4,272,662 | 6/1981 | Simpson | 200/275 |

*Primary Examiner*—Donald A. Griffin
*Attorney, Agent, or Firm*—Weingarten, Schurgin, Gagnebin & Hayes

[57] ABSTRACT

A mechanically actuable switch having associated electronic circuitry contained within the switch housing, including circuitry operative to selectively provide momentary, alternate action, and multistation switching modes. Included within the switch housing are a voltage/current regulator, initializing logic, contact debounce logic, mode control circuitry, output buffers, an LED driver and an LED. The switch contact is typically a preformed wire spring configured to be pivoted about a central point from one state of actuation to another. The switch is operable over a wide operating voltage range, typically 3 to 18 volts.

22 Claims, 7 Drawing Figures

UNIVERSAL LOGIC SWITCH

FIELD OF THE INVENTION

The present invention relates generally to electrical switches and more particularly to mechanically actuated switches having associated electronic circuits for providing intended operating functions.

BACKGROUND OF THE INVENTION

Electrical switches are widely employed in electronic circuits including digital electronic circuits. Such switches may be provided with debounce logic to minimize the false detection of a switch actuation caused by a transient or spurious contact closure. Such switches may also be provided with initializing logic to insure that the output terminals are at an initial known signal state upon initial switch actuation. LEDs are also commonly used in conjunction with switches to indicate the existing state of actuation. Typically, all of the debounce and initializing logic as well as any voltage or current regulators, output buffers, and associated LED circuitry is provided in the logic device with which the switch interfaces, and not in the switch itself. Each one of such switches is limited in the functions which it may perform, in the particular logic device with which it can interface, and in the range of voltages with which it is compatible.

Manually operated switches are available in different operating modes including momentary action types wherein the switch transition occurs only for so long as the switch is manually actuated, and alternate action types wherein the switch, upon a first actuation, undergoes a transition from one state to an opposite state and, upon a subsequent actuation, undergoes the reverse transition back to the one state. In general, to accomplish a particular switching function, it has heretofore been required to select a particular type of switch providing the intended switching mode, then select a compatible electronic circuit which is operable at a desired voltage.

SUMMARY OF THE INVENTION

Broadly speaking, the present invention provides a switch which incorporates all associated electronic circuitry within its housing and which is programmable by a user to select a particular switching mode. The switch includes a manually actuable switch element contained within a switch housing and integrated electronic circuitry operative in response to mechanical switch actuation to provide a debounced switch output and also operative selectably by the user to provide momentary switch actuation, alternate switch actuation or multistation switching. In addition, the switch includes within its housing initializing logic, output buffers, a voltage/current regulator, an LED driver and its associated LED. The switch housing includes mounting pins by which the switch interfaces with a logic device and by which power is applied to the switch circuitry, and switch outputs are provided for coupling to the associated circuits.

In a preferred embodiment, the manual actuator is a momentary action pushbutton and the switch connections are provided by a single preformed metal spring contact. The contact includes a lower arm having a central bend at continual electrical connection within an associated printed circuit conductive area, and the bend serves as a pivot point about which the two other bends in the lower arm move in selective electrical connection with corresponding contact areas of the printed circuit board. The upper arm of the contact serves as a bias spring in engagement with a manual actuating element, such as a pushbutton.

DESCRIPTION OF THE DRAWING

The objects, advantages and features of this invention will be more clearly appreciated from the following detailed description taken in conjunction with the accompanying drawing in which.

DETAILED DESCRIPTION OF THE PREFERRED EMBODIMENT

Figure 1:
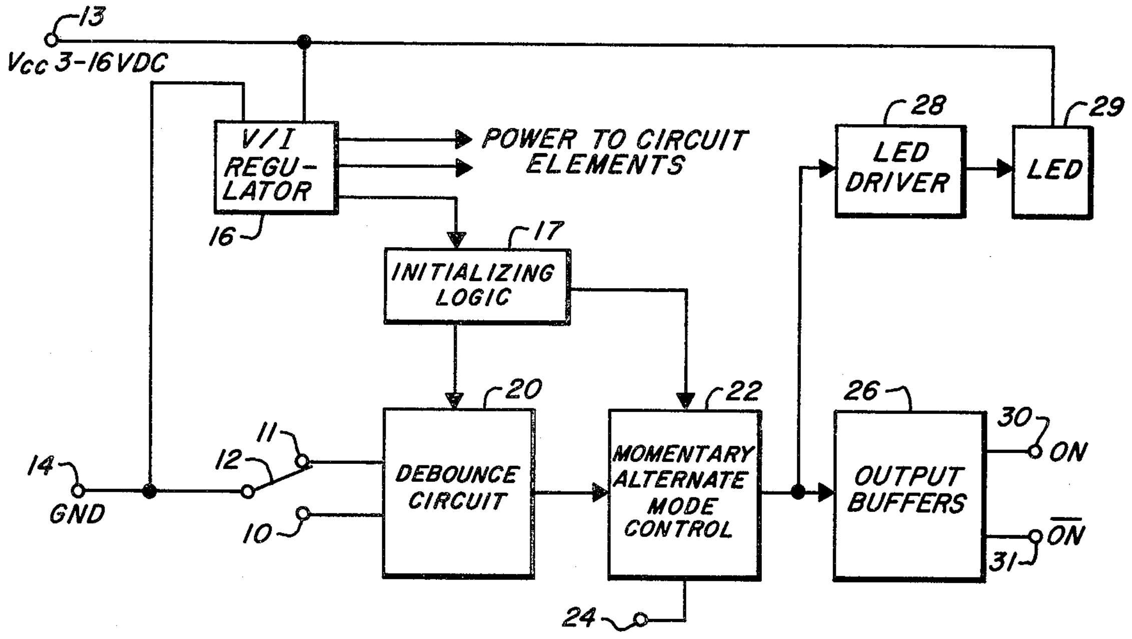
FIG. 1 is a block diagram of the electronic circuit embodied in the invention.

With reference to the drawing and more particularly to FIG. 1 thereof, there is shown a block diagram of the electronic circuitry contained within the switch housing and which forms part of the novel switch. A pair of switch contacts, normally open contact 10 and normally closed contact 11, are actuated by a switch arm 12. Switch arm 12 is typically a momentary action mechanical actuator switch is in electrical connection with normally closed contact 11 in its rest position, and with normally open contact 10 in its actuated position. Switch arm 12 may be a spring contact as described hereinafter or any other movable switch contact known to those skilled in the art. The switch arm is electrically connected to the ground side of the electrical circuit at terminal 14. The normally open contact 10 and the normally closed contact 11 are connected to a debounce circuit 20 which in turn is connected to a momentary/alternate mode control circuit 22 which is connected to output buffers 26. Power to operate all elements of the circuit is supplied by a voltage/current regulator 16 having power input terminals 13 and 14. Terminal 13 has a supply voltage, $V_{cc}$, applied to it, while terminal 14 is connected to a ground potential, as previously indicated. A control terminal 24 is connected to the mode control circuit 22 and provides selection of the intended operating mode depending upon whether a supply voltage or ground potential is applied to the control terminal. In the illustrated embodiment, if ground potential is applied to terminal 24, an alternate action mode is provided, while if the control terminal is returned to $V_{cc}$ or allowed to float, a momentary action operating mode is provided. The output buffers 26 provide a pair of complementary outputs on respective output terminals 30 and 31. Output terminals 30 and 31 are connectable to an external logic device and are configured to interface with most types of logic, including but not limited to, TTL, CMOS, DTL, RTL, HTL, NMOS, PMOS and IIL. An LED driver 28 energizes an associated LED 29 to denote a predetermined state of the switch.

The debounce circuit 20 is itself known in the art and provides an output signal only in response to a true switch closure and which eliminates spurious switch signals caused by contact bounce. The circuit typically consists of a pair of interconnected solid state devices forming an R-S flip-flop. One of the contacts 10 and 11 is used to set the flip-flop in the one state and the other of the contacts 10 and 11 is used to set the flip-flop in the opposite condition, so that repeated closings of either contact after a single initial pulse has no further effect. The flip-flop operates over a wide range of input current, allowing a large variation in input resistance, and thus the provision of this debounce circuit allows the use of contacts without the traditional noble metal surfaces. Similarly, noble metal need not be employed on the contact end of the switch arm 12. Alternatively, debounce circuit 20 may comprise other known debounce logic, such as a one-shot multivibrator.

The mode control circuit 22 provides either a momentary switching mode or an alternate action switching mode as determined by the state of the control terminal 24. This mode control circuit typically is formed by a plurality of gates interconnected to provide a divide-by-two function. The mode control circuit is disabled by allowing the potential on the control terminal 24 to rise to $V_{cc}$ either by allowing the terminal to float or by connecting it to $V_{cc}$ directly. When the mode control circuit is disabled, a momentary switching operation is provided wherein a transition from an initial state, typically OFF, to another state, typically ON, is provided only so long as the switch arm 12 is manually actuated and is not allowed to return to its rest position. Upon return of the switch arm to its rest position, the switch output also returns to its initial state, or OFF. With the control terminal 24 connected to ground, the mode control circuit is enabled, so that actuation of the switch arm causes a transition from an intial state to another state in an alternate action mode. The switch remains in that other state of actuation until subsequent manual actuation of the switch arm 12, whereupon the switch returns to the initial state of actuation.

Initializing logic 17 provides signals to the debounce circuit 20 and the mode control circuit 22 in a conventional way such that upon initial application of power to the circuit via terminals 13 and 14, the state of the outputs of the debounce circuit 20 and the mode control circuit 22 are predetermined. By such means, the output condition of the device is known at the time of power application, a condition necessary for the proper utilization of the novel switch with logic circuits. Typically, initializing logic 17 returns the switch to a OFF state after an interruption or cutoff of power to the switch circuits.

Output buffers 26 permit the use of a large range of input voltages by insuring that the output voltage is maintained to a desired tolerance regardless of the operating voltage. Output buffers 26 insure that regardless of the input voltage, an output voltage close to the supply voltage is present on terminal 30 when the device is in the ON state, and very close to circuit ground when the device is in the OFF state. Conversely, the output voltage on complementary terminal 31 is very close to circuit ground when the device in the ON state, and is close to the supply voltage when the device is in the OFF state. Thus, the output voltages are maintained at satisfactory levels to operate any of the types of logic with which the switch is to be used. Output buffers 26 typically permit the switch to operate with an input voltage in the range of 3 to 18 volts. The buffers are comprised of current mirrors used to source current with low output droop, and current sinking transistors to sink the required amount of current for most logic devices. LED driver 28 is operative to limit the LED current to a safe level over the wide range of input voltages without damage thereto.

In an optional configuration, control terminal 24 may also be used to selectively provide a third mode of operation, multistation switching. This feature may be incorporated into the switch, in addition to the momentary and alternate action modes, by minor internal changes in the switch circuitry of each switch in a multistation switch arrangement. A switch provided with this additional feature is illustrated by the block diagram of FIG. 1A. Initializing logic 17 is interconnected by internal gates with voltage/current regulator 16, and debounce circuit 20 is electrically connected to control terminal 24 by means of a known differentiator circuit 25. Voltage/current regulator 16 is also electrically connected to control terminal 24. The multistation switching mode is selectively enabled by electrically interconnecting or ganging the control terminals 24 of a plurality of like switches in a ganged switch arrangement. If the switch arm 12 of any one switch is moved to normally open contact 10 from normally closed contact 11, a signal is sent to differentiator 25 of that switch, which provides a short, clipped pulse of predetermined width to terminal 24 of all of the ganged switches. This pulse is coupled in each switch to the voltage/current regulator 16 to cause momentary cut-off of the power to the internal switch circuits. Upon removal of the pulse from differentiator 25, which occurs after a short interval independently of the movement of switch arm 12, power is reapplied to all circuits of each switch. Initializing logic 17 of each switch then automatically returns its switch to an OFF state of actuation as the switch is returned to normal operation. Since the one switch originally depressed is still depressed by the operator after this sequence of events, this one switch only is switched immediately into an ON state of actuation, as previously described for a single station switch. After removal of the pulse from differentiator 25 of the one switch, no potential exists at terminals 24 of any of the ganged switches, thus the one actuated switch is in an alternate action mode of operation, while the other switches are still in an OFF state of actuation. Thus, when the operator releases the switch arm 12 and it automatically returns to normally closed contact 11, the one actuated switch remains in an ON state.

Figure 1A:
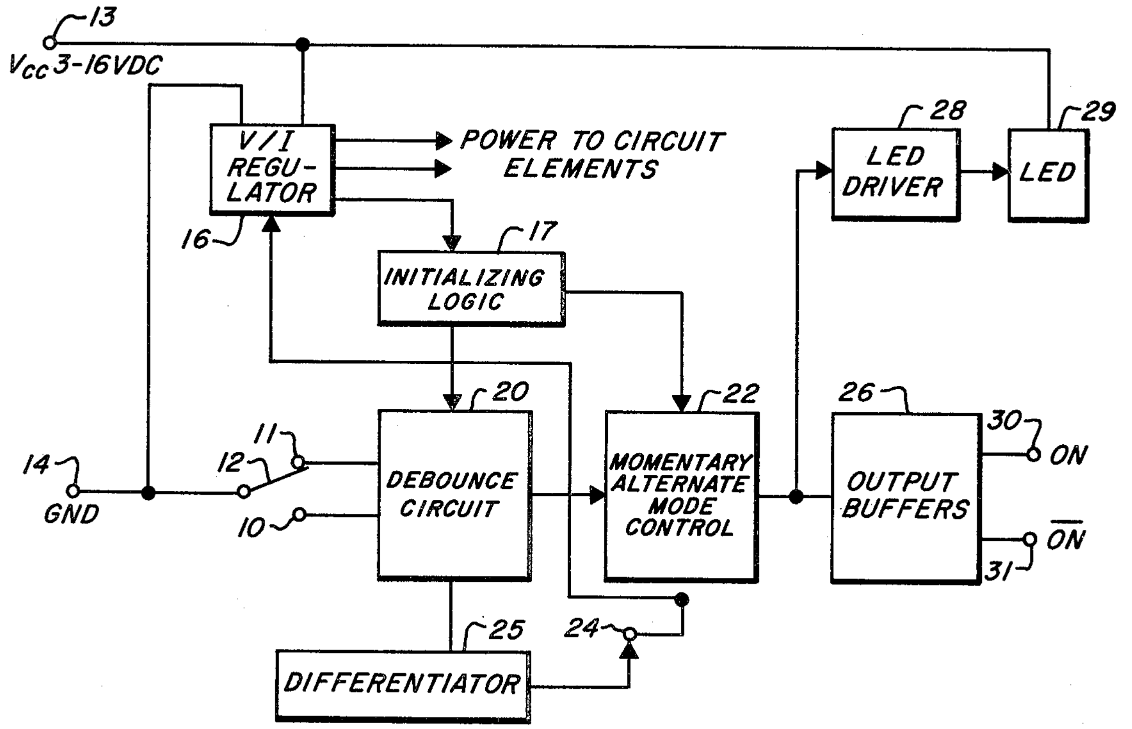
FIG. 1A is a block diagram of an alternative electronic circuit embodied in the invention providing multistation switching.
Figure 2:
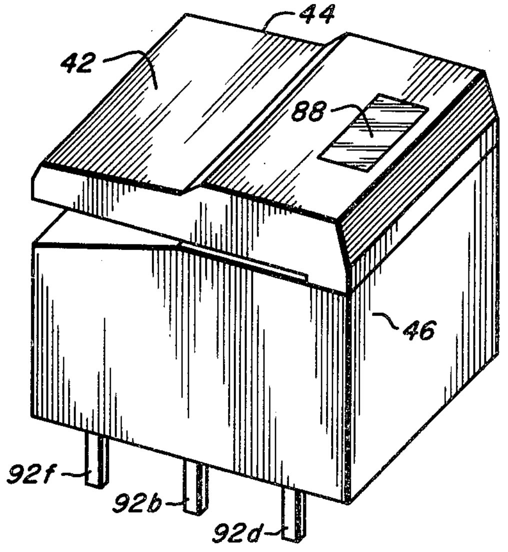
FIG. 2 is a perspective view of a switch of this invention.

If a switch having the configuration shown in FIG. 1A were used as a single station or stand-alone switch, it could still selectively provide an alternate action or momentary action mode of operation. If control terminal 24 is connected to ground for selection of a momentary mode, a low potential is present at terminal 24 and no pulse is sent by differentiator 25 to voltage/current regulator 16 to shut off power to the switch circuits. If terminal 24 is connected to a source of power for selection of the alternate action mode, the high potential at terminal 24 masks the pulse generated by differentiator 25 and thus power is not shut off and the switch operates in the alternate action mode. In the configuration of FIG. 1A, terminal 24 cannot be allowed to float for selection of an alternate action mode, as the signal from differentiator 25 would not be masked and would cut off power to the switch and return it to an OFF state.

Although the switch of FIGS. 1 and 1A has been described with regard to direct current actuation in which switch arm 12 must physically contact either contact 10 or 11 to provide a switching function, an alternating current input voltage may also be provided. In such a case, an alternating current proximity switch may be used so that the switch arm 12 need not physically touch contacts 10 or 11 to perform a mechanical switching action. Since the alternating current may be detected through a small air gap, this feature further facilitates the use of non-noble metal or ditry contacts in place of the typical gold contacts, thereby significantly reducing the cost of the switch.

With reference now to FIGS. 2–6, a preferred mechanical embodiment of this invention will be described. The switch of FIGS. 2–6 is a momentary action pushbutton type and includes a housing 46 and a cap 44. Cap 44 is pivotally mounted on housing 46 by hinge arms 45 which extend from cap 44 into housing 46 and are pivotally secured to pivot pin 47. Depression of cap 44 at a recessed section 42 causes cap 44 to pivot about pin 47 to actuate the switch. Upper wall 67 of housing 46 is sloped away from hinge arms 45 to accommodate depression of cap 44. A detent 64 on cap 44 projects through hole 65 in housing 46 to engage contact 52 within housing 46 for pivoting thereof, as will be described. A plurality of typically six terminals 92(*a–f*) projects from one side of housing 46 for external electrical connection of the circuits of the switch. Housing 46 includes a printed circuit (PC) board 48 having an integrated circuit 50 electrically connected thereto, and in this embodiment, depending therefrom. Integrated circuit 50 contains each of the circuits as shown and described in FIG. 1 or FIG. 1A and is electrically connected to PC board 48 by a plurality of leads 86(*a–h*), which are eight in number. Also associated with PC board 48 is a light emitting diode (LED) which projects through housing 46 and cap 44 to be externally visible. Contact 52 is captured between PC board 48 and upper wall 67.

Contact 52 preferably is a preformed spring having an upper arm 56 and a lower arm 58 which are connected at one end at bight 54 and which are spaced at respective distal ends 60 and 62. Contact 62 is tensioned about bight 54 during forming and shaping thereof so that upper arm 56 and lower arm 58 are spring biased away from one another at distal ends 60 and 62. Lower arm 58 rests on PC board 48 while upper arm 60 is urged against a projection 73 extending downwardly from the inside surface 65 of upper wall 67 of housing 46 and against the lower end of detent 64 on cap 44 by the spring bias imparted to contact 52. Projection 73 facilitates the pivoting of contact 52, to be described. Contact 52 is also laterally restrained by projections 66 which depend downwardly from surface 65 of housing 46 and is longitudinally contained by wall 68 and backwall 69. Typically, distal end 60 of contact 52 is curved slightly downwardly towards PC board 48 to prevent damage to the interior switch surfaces.

Lower arm 58 is provided with three projecting bends, one bend 70 being adjacent bight 54, another bend 72 being disposed generally intermediate bight 54 and distal end 62 and another bend 74 being adjacent distal end 62. Bend 72 serves as a pivot point for lower arm 58 and thus contact 52. Bends 70 and 74 as well as bend 72 serve as contact points for lower arm 58, and bend 70 is associated with contact land or pad 76 on PC board 48, bend 72 is associated with contact land or pad 78 and is in constant electrical connection therewith, while bend 74 is associated with contact land or pad 80.

Figure 3:
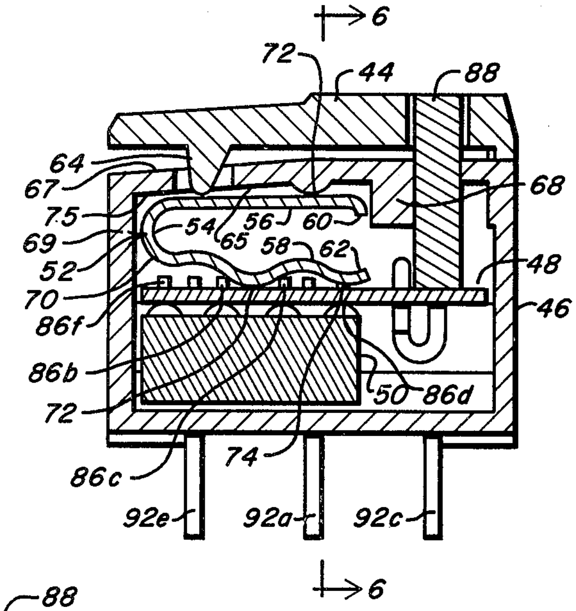
FIG. 3 is a cross-sectional side view of the switch of FIG. 2 in one operating position.
Figure 4:
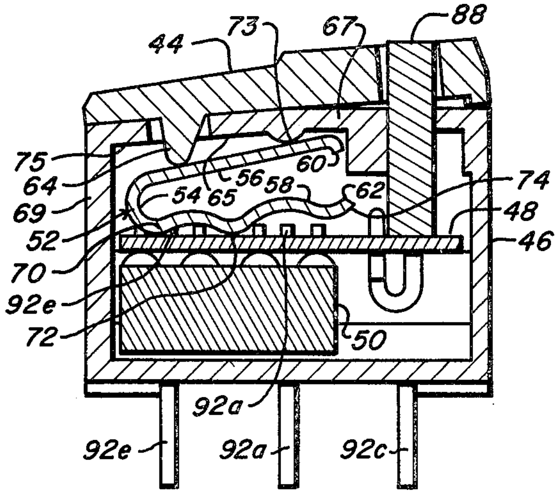
FIG. 4 is a cross-sectional side view of the switch of FIG. 2 in a second operating position.

With reference now to FIG. 3, contact 52 is shown in one operating position in which cap 44 is not depressed and in which cap 44 and housing 46 are separated adjacent recess 42. Detent 64 rests on upper arm 56 in engagement therewith just to the left of bend 72 of lower arm 58, as shown in FIG. 3. In this position, distal ends 60 and 62 are separated to their greatest permissible extent, and bend 72 is resting in electrical connection with pad 78, bend 74 is resting in electrical connection with pad 80, and bend 70 is spaced from its associated pad 76. Upper arm 56 rests against upper surface 67. With reference now to FIG. 4, the switch is shown in its depressed condition in which cap 44 has been pushed downwardly, thus causing detent 64 to press downwardly on upper arm 56 of contact 52. Contact 52 is pivoted about bend 72 into another operating position in which bend 70 rests in electrical connection with pad 76, and bend 72 remains in electrical connection with pad 78. Upper arm 56 is no longer parallel to upper surface 67, and bend 74 is spaced from its associated pad 80 and is no longer in electrical connection therewith. When pressure is released from cap 44, the switch returns to the position shown in FIG. 3. Contact 52 pivots to the left in FIG. 4 when cap 44 is depressed because detent 64 is offset toward bight 54 from the pivot point at bend 70. Contact 52 pivots to the right in FIG. 3 and cap 44 returns to its raised position when pressure is released from cap 44 because of the spring bias imparted to contact 52.

Figure 5:
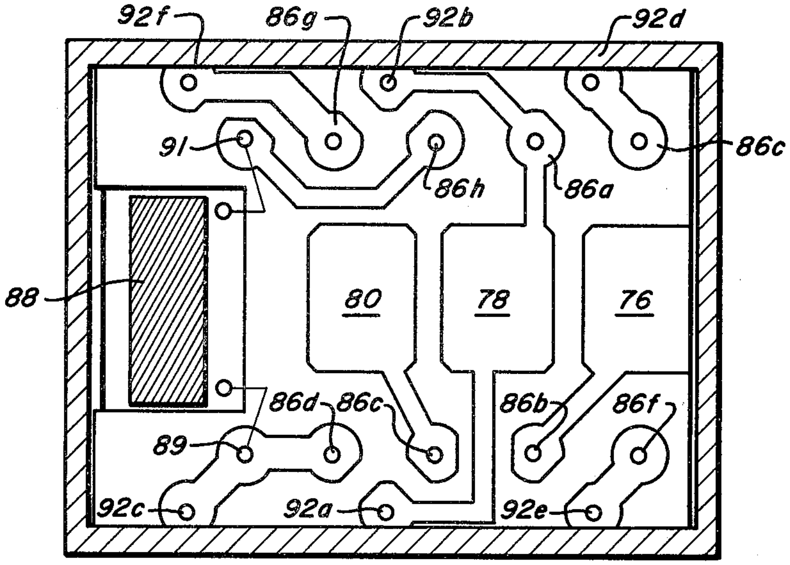
FIG. 5 is a cross-sectional top view of the switch of FIG. 2.
Figure 6:
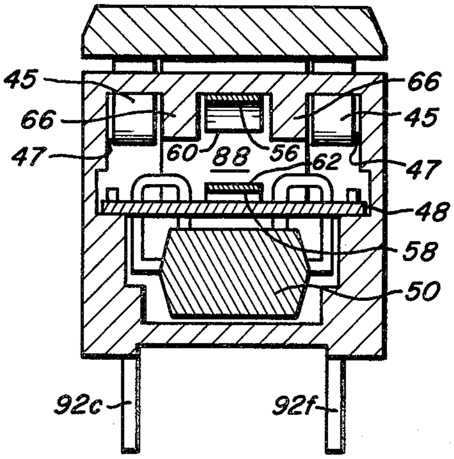
FIG. 6 is a cross-sectional end view of the switch of FIG. 2.

In this particular embodiment, as shown in FIG. 5, pad 78 is electrically connected to terminals 92*a* and 92*b*, which serve as the ground terminals and to lead 86*a*, the ground connection for the integrated circuit 50. Pad 76 is electrically connected to integrated circuit 50 at lead 86*b*, while pad 80 is electrically connected to integrated circuit 50 at lead 86*c*. Pad 78 which remains in electrical connection with contact 52 at all times serves as the ground, and pads 76 and 80 are electrically connected to the debounce circuit 20 of FIG. 1. Power is supplied to the switch at power terminal 92*c* which is electrically connected to the lead 86*d* and to LED at point 89. Lead 86*e* and 86*f* are the output connections and they are electrically connected to output terminals 92*d* and 92*e* respectively, as shown in FIG. 5. Terminal 92*f* is the mode control terminal and is electrically connected to integrated circuit 50 by lead 86*g*. Lead 86*h* is the control for LED 88 and is electrically connected thereto at connection 91.

In operation, the state of actuation of the switch is changed by depression of cap 44 at recess 42. The operating mode of the switch of FIG. 1A is determined by whether terminal 92*f* is connected to ground, $V_{cc}$ or terminals 92*f* of other switches, and in the configuration of FIG. 1, the operating mode of the switch is determined by whether terminal 92*f* is connected to ground or to $V_{cc}$ or is allowed to float. If terminal 92*f* is connected to ground in either embodiment, the switch operates as an alternate action switch, while if it is or connected to $V_{cc}$ in either embodiment, the switch operates as a momentary action switch, as described. If terminal 92*f* is allowed to float in the embodiment of FIG. 1, the switch operates as a momentary action switch. If terminal 92*f* is connected to terminals 92*f* of other ganged switches in the embodiment of FIG. 1A, the switch is in a multistation mode. If in a momentary mode, as cap 44 is depressed to the position shown in FIG. 4, the switch goes from an OFF to an ON state. The switch remains in an ON state so long as cap 44 is depressed. As soon as cap 44 is released, contact 52 returns to its rest position shown in FIG. 3 and the switch is returned to its OFF state. If in an alternate action or multistation mode, the switch remains in an ON state upon release of cap 44. Cap 44 must be depressed and released again to return the switch to the OFF state in the alternate action mode.

In either the momentary or alternate action modes, initializing logic 17 insures that the switch is always in an OFF position during start up of the logic device with which the switch interfaces. In any mode, when cover 44 is depressed, contact 52 pivots from the position shown in FIG. 3 to the position shown in FIG. 4 about bend 72. Pads 76 and 78 are thus interconnected, manually initiating the switching action, and debounce circuit 20 is actuated to electrically alter the state of actuation. Simultaneously therewith, the LED driver is actuated in the ON state or deactuated in the OFF state. Once pressure is released from cap 44, the spring bias imparted to contact 52 urges cap 44 upwardly away from housing 46 and causes contact 52 to pivot about bend 72 from the position shown in FIG. 4 to that shown in FIG. 3.

Some of the components of the switch may be formed in several different configurations for specialized purposes, but their shape in general, forms no part of this invention. Instead of a pushbutton mechanically actuated switch, a toggle switch may also be used in conjunction with a contact which would be suitably configured to conform to the shape of the toggle. In all other respects, the toggle acutated switch would operate in the same fashion as the switch herein described. Furthermore, the switch itself may be mounted in a panel by known means and it is not necessary that these means be discussed in detail herein. The cover 44 and the base 46 are typically composed of non-conductive material such as a thermoplastic. The contact 52 may be formed of any conductive resilient material such as beryllium copper. Terminal 92 can be formed of any conductive material such as plated brass while pads 76, 78 and 80 may also be formed of any electrically conductive material such as plated copper. For reference purposes, examples of the dimensions of a pushbutton switch of this invention are set forth. It is understood that by providing such examples, the scope of the invention is in no way limited. Housing 46 and cap 44 form a combination typically of 0.565 inch (1.44 cm) high, 0.490 inch (1.24 cm) wide and 0.680 inch (1.73 cm) thick. The terminals typically projected 0.145 inch (0.37 cm) outwardly from the base and the LED typically has the dimensions of 0.080 inch (0.20 cm) $\times$ 0.200 inch (0.51 cm).

In view of the above description, it is likely that modifications and improvements will occur to those skilled in the art which are within the scope of this invention.

What is claimed is:

1. A logic switch operable over a predetermined range of input voltages, comprising:
- a housing;
- mechanical switching means provided within said housing and adapted to be moved by manual force momentarily from a rest position to a second operating position, said switching means remaining in said second operating position only so long as manual force is applied thereto;
- electronic switching means within said housing for producing an electrical switching function in a selected operating mode from one state of actuation of another state in response to movement of said mechanical switching means from one of said rest and second positions to the other of said rest and second positions, said operating modes including at least a momentary action mode and an alternate action mode;
- circuit means within said housing for initializing said electronic switching means in one of said states of actuation upon interruption of power to said switch;
- means provided within said housing for selecting the mode of operation of said electronic switching means; and
- output buffer circuit means within said housing for providing a complementary output voltage.

2. The logic switch of claim 1 further comprising within said housing a light-emitting diode and circuitry for powering the light-emitting diode, said powering circuitry being operable over said predetermined range of input voltages.

3. The logic switch of claim 1 wherein said electronic switching means comprises switch debounce logic.

4. The logic switch of claim 1 wherein said mechanical switching means comprises:
- a manual switch actuator disposed on said housing; and
- a pivotally disposed spring biased contact adapted to be pivoted in response to movement of said manual switch actuator from said rest operating position wherein a first and a second contact lands are electrically interconnected to said second operating position wherein said first contacts land and a third contact land are electrically interconnected.

5. The logic switch of claim 4 wherein said switch actuator is a pushbutton.

6. The logic switch of claim 4 wherein said contact comprises an upper and a lower arm spring biased away from one another at said lower arm having three projecting contact bends, including a centrally disposed point about which said contact pivots disposed between the other two of said points, said first contact land being in continual electrical connection with said central point, said second and third contact lands being adapted to be selectively electrically connected to an associated one of said two other points by pivoting of said contact.

7. The logic switch of claim 1 wherein the modes of operation available to said selecting means further include multistation switching.

8. The logic switch of claim 1 wherein said selecting means comprises:
- circuit means providing a divide-by-two function; and
- a first terminal for selectively enabling said divide-by-two circuit means by selective electrical connection to a ground terminal, and for selectively disabling said divide-by-two circuit means by selective connection to a voltage source.

9. The logic switch of claim 8 wherein said divide-by-two circuit means is also disabled when said first terminal is allowed to float.

10. The logic switch of claim 8 or 9 wherein said switch is in a momentary action switching mode when said divide-by-two circuit means is disabled.

11. The logic switch of claim 8 wherein said switch is in an alternate action switching mode when said divide-by-two circuit means is enabled.

12. The logic switch of claim 1 or 8 further comprising:

voltage and current regulating circuit means disposed within said housing, said regulating circuit means being adapted to interrupt power to all circuits of said logic switch upon the receipt of a specified electrical pulse;

means interconnecting said voltage and current regulating circuit means and said selecting means;

means interconnecting said voltage and current regulating circuit means and said initializing means to actuate said initializing means upon interruption of power by said voltage and current regulating circuit means; and differentiator circuit means interconnecting said debounce circuit means and said selecting means for producing said specified electrical pulse when receiving a signal from said electronic switching means in response to movement of said mechanical switching means to said second position;

said logic switch being in a multistation mode of operation when said selecting means of one logic switch is electrically connected to said selecting means of a plurality of others of said logic switches, said differentiator circuit means of one switch in which said switching means is in said second position sending said specified electrical pulse to said voltage and current regulating circuit means of each of said others of said logic switches to return said others of said logic switches to said one of said one and said another state of actuation, said one switch only being in an alternate action mode in said multistation switching mode.

13. The logic switch of claim 1 further comprising voltage and current regulating circuit means disposed within said housing.

14. A logic switch comprising:

a manually operated actuator momentarily movable from a rest to a second operating position;

switching circuit means for providing a switching function in a selected one of momentary, alternate action and multistation switching operating modes in response to movement of said actuator between said rest and said second operating positions; and means for selecting the operating mode of said switching circuit means, said selecting means comprising:

second circuit means providing a divide-by-two function; and a terminal electrically connected to said second circuit means and adapted to be selectively electrically connected to a source of power for disabling said second circuit means to provide a momentary action switching mode, to a ground source for enabling said second circuit means to provide an alternate action switching mode, and to said terminal of others of said logic switches to provide a multistation switching mode.

15. The logic switch of claim 14 further comprising:

means for controlling power to all circuits of said logic switch and adapted to interrupt power to all circuits of said logic switch upon receipt of a specified electrical pulse;

means for initializing said switching circuit means in a desired state of actuation upon interruption of power to said logic switch;

means electrically interconnecting said power controlling means and said initializing means to actuate said initializing means upon interruption of power by said power controlling means;

means electrically interconnecting said power controlling means and said terminal; and differentiator circuit means interconnecting said switching circuit means and said terminal for producing said specific electrical pulse upon receipt of a signal from said switching circuit means in response to movement of said actuator into said second operating position;

said specified electrical pulse being transmitted from said terminal of one of said logic switches in which said actuator is in said second position to said terminals and to said power controlling means of other interconnected ones of said logic switches in said multistation switching mode to return said other ones of said logic switches to said desired state of actuation, said one logic switch being in an alternate action mode in said multistation switching mode.

16. A switch comprising:

a housing defining a cavity therein and having an upper surface;

a momentary action pushbutton actuator movable with respect to said housing from a rest position to an actuated position;

printed circuit board means disposed within said cavity in confronting relation with said upper surface of said housing, said printed circuit board having three aligned contact lands thereon;

a contact captured between said upper surface of said housing and said printed circuit board means and having an upper arm and a lower arm, said upper arm being spring biased against said upper surface of said housing, said lower arm being spring biased against said printed circuit board means and having a centrally disposed projection resting in pivotal electrical connection with a central one of said contact lands and two other projecting contact points each associated with one of the other two of said contact lands, one of said two other contact points being in electrical connection with one of said other two contact lands only in said rest position and the other of said two other contact points being in electrical connection with the other of said other two contact lands only in said actuated position; and means associated with said actuator for pivoting said contact in a first direction about said central projection upon movement of said actuator from said rest position to said actuated position and for returning said actuator to said rest position upon release of said actuator under the influence of the spring bias imparted to said upper arm.

17. The switch of claim 16 wherein said actuator means comprises a projection extending from said actuator through an orifice in said upper surface of said housing and engaging said upper arm of said contact generally between said central projections and said one of said contact points on said lower arm.

18. The switch of claim 17 wherein said actuator is pivotally connected to said housing at a position spaced from said projection.

19. The switch of claim 16 further comprising a curved portion disposed on a distal end of said upper arm adapted to bear against a wall of said housing.

20. The switch of claim 16 further comprising integrated circuit means disposed within said housing for producing an electronic switching function in response to movement of said actuator between said rest position and said actuated position.

21. The switch of claim 16 wherein said two other projecting contact points comprise bends formed in said lower arm and wherein said centrally disposed projection comprises a bend formed in said lower arm and having an amplitude geater than that of said other projecting contact points.

22. A logic switch operable over a predetermined range of input voltages, comprising:

a housing;

mechanical switching means having at least a pair of switch contacts and a switch arm therebetween provided within said housing, said switch arm adapted to be moved by manual force momentarily from a rest position in contact with one of said pair of switch contacts to a second operating position in contact with the other one of said switch contacts, said switching means remaining in said second operating position only so long as manual force is applied thereto;

electronic switching means within said housing for producing an electrical switching function in a selected operating mode from one state of actuation to another state in response to movement of said arm of said mechanical switching means from one of said rest and said second contact positions to the other of said rest and said second contact positions;

circuit means within said housing for initializing said electronic switching means in one of said states of acutation upon interruption of power to said switch;

means provided within said housing for selecting the mode of operation of said electronic switching means; and output buffer circuit means within said housing for providing a complementary output voltage.

* * * * *